United States Patent
East, Jr. et al.

(10) Patent No.: US 7,318,473 B2
(45) Date of Patent: Jan. 15, 2008

(54) METHODS RELATING TO MAINTAINING THE STRUCTURAL INTEGRITY OF DEVIATED WELL BORES

(75) Inventors: Loyd E. East, Jr., Tomball, TX (US); Neil A. Stegent, Cypress, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 366 days.

(21) Appl. No.: 11/074,401

(22) Filed: Mar. 7, 2005

(65) Prior Publication Data

US 2006/0196661 A1    Sep. 7, 2006

(51) Int. Cl.
*E21B 43/02* (2006.01)
*E21B 43/04* (2006.01)

(52) U.S. Cl. ............... 166/278; 166/50; 166/276; 166/384; 507/925

(58) Field of Classification Search ........... 166/50, 166/276, 278, 384; 507/925
See application file for complete search history.

(56) References Cited

U.S. PATENT DOCUMENTS

| | | | |
|---|---|---|---|
| 2,238,671 A | 4/1941 | Woodhouse | 166/21 |
| 2,703,316 A | 3/1955 | Palmer | 260/78.3 |
| 2,869,642 A | 1/1959 | McKay et al. | |
| 3,047,067 A | 7/1962 | Williams et al. | 166/33 |
| 3,123,138 A | 3/1964 | Robichaux | 166/33 |
| 3,176,768 A | 4/1965 | Brandt et al. | 166/33 |
| 3,199,590 A | 8/1965 | Young | 166/33 |
| 3,272,650 A | 9/1966 | MacVittie | 134/7 |
| 3,297,086 A | 1/1967 | Spain | 166/33 |
| 3,308,885 A | 3/1967 | Sandiford | 166/33 |
| 3,316,965 A | 5/1967 | Watanabe | 166/33 |
| 3,336,980 A | 8/1967 | Rike | 166/295 |
| 3,375,872 A | 4/1968 | McLaughlin et al. | 166/29 |
| 3,404,735 A | 10/1968 | Young et al. | 166/33 |
| 3,415,320 A | 12/1968 | Young | 166/33 |
| 3,492,147 A | 1/1970 | Young et al. | 117/62.2 |
| 3,659,651 A | 5/1972 | Graham | 166/280 |
| 3,681,287 A | 8/1972 | Brown et al. | 260/67 |
| 3,708,013 A | 1/1973 | Dismuke | 166/276 |
| 3,709,298 A | 1/1973 | Pramann | 166/276 |

(Continued)

FOREIGN PATENT DOCUMENTS

CA    2063877    5/2003

(Continued)

OTHER PUBLICATIONS

U.S. Appl. No. 10/649,029, filed Aug. 27, 2003, Nguyen et al.

(Continued)

*Primary Examiner*—George Suchfield
(74) *Attorney, Agent, or Firm*—Robert A. Kent; Baker Botts, L.L.P.

(57) ABSTRACT

Methods of enhancing at least partially the structural integrity of a longitudinal portion of a deviated well bore are provided. The methods include providing a gravel matrix composition; providing a longitudinal portion of a deviated well bore; and placing a sufficient amount of the gravel matrix composition in the longitudinal portion to enhance the structural support of the longitudinal portion. Optional additives may include curable resins, tackifiers, and/or the incorporation of a degradable material in the gravel matrix composition.

18 Claims, 1 Drawing Sheet

U.S. PATENT DOCUMENTS

| | | | |
|---|---|---|---|
| 3,754,598 A | 8/1973 | Holloway, Jr. | 166/249 |
| 3,765,804 A | 10/1973 | Brandon | 417/540 |
| 3,768,564 A | 10/1973 | Knox et al. | 166/307 |
| 3,784,585 A | 1/1974 | Schmitt et al. | 260/861 |
| 3,819,525 A | 6/1974 | Hattenbrun | 252/132 |
| 3,828,854 A | 8/1974 | Templeton et al. | 166/307 |
| 3,842,911 A | 10/1974 | Know et al. | 166/307 |
| 3,854,533 A | 12/1974 | Gurley et al. | 166/276 |
| 3,857,444 A | 12/1974 | Copeland | 166/276 |
| 3,863,709 A | 2/1975 | Fitch | 165/1 |
| 3,868,998 A | 3/1975 | Lybarger et al. | 166/278 |
| 3,888,311 A | 6/1975 | Cooke, Jr. | 166/280 |
| 3,912,692 A | 10/1975 | Casey et al. | 260/78.3 |
| 3,948,672 A | 4/1976 | Harnsberger | 106/90 |
| 3,955,993 A | 5/1976 | Curtice | 106/90 |
| 3,960,736 A | 6/1976 | Free et al. | 252/8.55 R |
| 4,008,763 A | 2/1977 | Lowe | 166/253 |
| 4,015,995 A | 4/1977 | Hess | 106/287 |
| 4,029,148 A | 6/1977 | Emery | 166/250.1 |
| 4,031,958 A | 6/1977 | Sandiford et al. | 166/270 |
| 4,042,032 A | 8/1977 | Anderson et al. | 166/276 |
| 4,070,865 A | 1/1978 | McLaughlin | 61/36 |
| 4,074,760 A | 2/1978 | Copeland et al. | 166/276 |
| 4,085,801 A | 4/1978 | Sifferman | 166/295 |
| 4,127,173 A | 11/1978 | Watkins et al. | 166/276 |
| 4,169,798 A | 10/1979 | DeMartino | 252/8.55 R |
| 4,172,066 A | 10/1979 | Zweigle et al. | 260/29.6 TA |
| 4,245,702 A | 1/1981 | Haafkens et al. | 166/307 |
| 4,273,187 A | 6/1981 | Satter et al. | 166/250 |
| 4,291,766 A | 9/1981 | Davies et al. | 166/276 |
| 4,305,463 A | 12/1981 | Zakiewicz | 106/245 |
| 4,336,842 A | 6/1982 | Graham et al. | 166/276 |
| 4,352,674 A | 10/1982 | Fery | 23/230 |
| 4,353,806 A | 10/1982 | Canter et al. | 507/229 |
| 4,387,769 A | 6/1983 | Erbstoesser et al. | 166/295 |
| 4,415,805 A | 11/1983 | Fertl et al. | 250/260 |
| 4,439,489 A | 3/1984 | Johnson et al. | 428/404 |
| 4,443,347 A | 4/1984 | Underdown et al. | 252/8.55 R |
| 4,460,052 A | 7/1984 | Gockel | 175/72 |
| 4,470,915 A | 9/1984 | Conway | 252/8.55 R |
| 4,493,875 A | 1/1985 | Beck et al. | 428/403 |
| 4,494,605 A | 1/1985 | Wiechel et al. | 166/288 |
| 4,498,995 A | 2/1985 | Gockel | 252/8.5 LC |
| 4,501,328 A | 2/1985 | Nichols | 166/288 |
| 4,526,695 A | 7/1985 | Erbstoesser et al. | 252/8.55 R |
| 4,527,627 A | 7/1985 | Graham et al. | 166/280 |
| 4,541,489 A | 9/1985 | Wu | 166/312 |
| 4,546,012 A | 10/1985 | Brooks | 427/213 |
| 4,553,596 A | 11/1985 | Graham et al. | 166/295 |
| 4,564,459 A | 1/1986 | Underdown et al. | 252/8.55 R |
| 4,572,803 A | 2/1986 | Yamazoe et al. | 534/16 |
| 4,649,998 A | 3/1987 | Friedman | 166/294 |
| 4,664,819 A | 5/1987 | Glaze et al. | 252/8.551 |
| 4,665,988 A | 5/1987 | Murphey et al. | 166/295 |
| 4,669,543 A | 6/1987 | Young | 166/276 |
| 4,675,140 A | 6/1987 | Sparks et al. | 264/4.3 |
| 4,683,954 A | 8/1987 | Walker et al. | 166/307 |
| 4,694,905 A | 9/1987 | Armbruster | 166/280 |
| 4,715,967 A | 12/1987 | Bellis et al. | 252/8.551 |
| 4,716,964 A | 1/1988 | Erbstoesser et al. | 166/284 |
| 4,733,729 A | 3/1988 | Copeland | 166/276 |
| 4,739,832 A | 4/1988 | Jennings, Jr. et al. | 166/299 |
| 4,785,884 A | 11/1988 | Armbruster | 166/280 |
| 4,787,453 A | 11/1988 | Hewgill et al. | 166/272.3 |
| 4,789,105 A | 12/1988 | Hosokawa et al. | 241/67 |
| 4,796,701 A | 1/1989 | Hudson et al. | 166/278 |
| 4,797,262 A | 1/1989 | Dewitz | 422/142 |
| 4,800,960 A | 1/1989 | Friedman et al. | 166/276 |
| 4,809,783 A | 3/1989 | Hollenbeck et al. | 166/307 |
| 4,817,721 A | 4/1989 | Pober | 166/295 |
| 4,829,100 A | 5/1989 | Murphey et al. | 523/131 |
| 4,838,352 A | 6/1989 | Oberste-Padtberg et al. | 166/291 |
| 4,842,072 A | 6/1989 | Friedman et al. | 166/295 |
| 4,843,118 A | 6/1989 | Lai et al. | 524/555 |
| 4,848,467 A | 7/1989 | Cantu et al. | 166/281 |
| 4,848,470 A | 7/1989 | Korpics | 166/312 |
| 4,850,430 A | 7/1989 | Copeland et al. | 166/276 |
| 4,886,354 A | 12/1989 | Welch et al. | 356/70 |
| 4,888,240 A | 12/1989 | Graham et al. | 428/403 |
| 4,895,207 A | 1/1990 | Friedman et al. | 166/276 |
| 4,903,770 A | 2/1990 | Friedman et al. | 166/288 |
| 4,934,456 A | 6/1990 | Moradi-Araghi | 166/270 |
| 4,936,385 A | 6/1990 | Weaver et al. | 166/288 |
| 4,942,186 A | 7/1990 | Murphey et al. | 523/131 |
| 4,957,165 A | 9/1990 | Cantu et al. | 166/295 |
| 4,959,432 A | 9/1990 | Fan et al. | 526/287 |
| 4,961,466 A | 10/1990 | Himes et al. | 166/250 |
| 4,969,522 A | 11/1990 | Whitehurst et al. | 166/278 |
| 4,969,523 A | 11/1990 | Martin et al. | 166/278 |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,030,603 A | 7/1991 | Rumpf et al. | 501/127 |
| 5,049,743 A | 9/1991 | Taylor, III et al. | 250/303 |
| 5,082,056 A | 1/1992 | Tackett, Jr. | 166/295 |
| 5,105,886 A | 4/1992 | Strubhar et al. | 166/280 |
| 5,107,928 A | 4/1992 | Hilterhaus | 166/293 |
| 5,128,390 A | 7/1992 | Murphey et al. | 523/130 |
| 5,135,051 A | 8/1992 | Fracteau et al. | 166/104 |
| 5,142,023 A | 8/1992 | Gruber et al. | 528/354 |
| 5,165,438 A | 11/1992 | Fracteau et al. | 137/1 |
| 5,173,527 A | 12/1992 | Calve | 524/74 |
| 5,178,218 A | 1/1993 | Dees | 166/281 |
| 5,182,051 A | 1/1993 | Bandy et al. | 252/645 |
| 5,199,491 A | 4/1993 | Kutts et al. | 166/276 |
| 5,199,492 A | 4/1993 | Surles et al. | 166/295 |
| 5,211,234 A | 5/1993 | Floyd | 166/276 |
| 5,216,050 A | 6/1993 | Sinclair | 524/108 |
| 5,218,038 A | 6/1993 | Johnson et al. | 524/541 |
| 5,232,955 A | 8/1993 | Caabai et al. | 521/63 |
| 5,232,961 A | 8/1993 | Murphey et al. | 523/414 |
| 5,238,068 A | 8/1993 | Fredickson | 166/307 |
| 5,247,059 A | 9/1993 | Gruber et al. | 528/354 |
| 5,249,628 A | 10/1993 | Surjaatmadia | 166/305 |
| 5,256,729 A | 10/1993 | Kutts et al. | 524/700 |
| 5,273,115 A | 12/1993 | Spafford | 166/281 |
| 5,285,849 A | 2/1994 | Surles et al. | 166/295 |
| 5,293,939 A | 3/1994 | Surles et al. | 166/295 |
| 5,295,542 A | 3/1994 | Cole et al. | 166/278 |
| 5,320,171 A | 6/1994 | Laramay | 166/285 |
| 5,321,062 A | 6/1994 | Landrum et al. | 523/141 |
| 5,325,923 A | 7/1994 | Surjaatmadja et al. | 166/308 |
| 5,330,005 A | 7/1994 | Card et al. | 166/280 |
| 5,332,037 A | 7/1994 | Schmidt et al. | 166/276 |
| 5,335,726 A | 8/1994 | Rodrogues | 166/295 |
| 5,351,754 A | 10/1994 | Hardin et al. | 166/249 |
| 5,358,051 A | 10/1994 | Rodrigues | 166/295 |
| 5,359,026 A | 10/1994 | Gruber | 528/354 |
| 5,360,068 A | 11/1994 | Sprunt et al. | 166/259 |
| 5,361,856 A | 11/1994 | Surjaatmadja et al. | 175/67 |
| 5,363,916 A | 11/1994 | Himes et al. | 166/276 |
| 5,373,901 A | 12/1994 | Norman et al. | 166/300 |
| 5,377,759 A | 1/1995 | Surles | 166/295 |
| 5,381,864 A | 1/1995 | Nguyen et al. | 166/280 |
| 5,386,874 A | 2/1995 | Laramay et al. | 166/300 |
| 5,388,648 A | 2/1995 | Jordan, Jr. | 166/380 |
| 5,393,810 A | 2/1995 | Harris et al. | 524/56 |
| 5,396,957 A | 3/1995 | Surjaatmadja et al. | 166/308 |
| 5,402,846 A | 4/1995 | Jennings, Jr. et al. | 166/259 |
| 5,422,183 A | 6/1995 | Sinclair et al. | 428/403 |
| 5,423,381 A | 6/1995 | Surles et al. | 166/295 |
| 5,439,055 A | 8/1995 | Card et al. | 166/280 |
| 5,460,226 A | 10/1995 | Lawton et al. | 166/300 |

| | | | | | | | |
|---|---|---|---|---|---|---|---|
| 5,464,060 A | 11/1995 | Hale et al. | 166/293 | 5,934,376 A * | 8/1999 | Nguyen et al. | 166/278 |
| 5,475,080 A | 12/1995 | Gruber et al. | 528/354 | 5,944,105 A | 8/1999 | Nguyen | 166/278 |
| 5,484,881 A | 1/1996 | Gruber et al. | 528/354 | 5,945,387 A | 8/1999 | Chatterji et al. | 507/224 |
| 5,492,178 A | 2/1996 | Nguyen et al. | 166/276 | 5,948,734 A | 9/1999 | Sinclair et al. | 507/219 |
| 5,494,103 A | 2/1996 | Surjaatmadja et al. | 166/222 | 5,957,204 A | 9/1999 | Chatterji et al. | 166/295 |
| 5,497,830 A | 3/1996 | Boles et al. | 166/300 | 5,960,877 A | 10/1999 | Funkhouser et al. | 166/270 |
| 5,498,280 A | 3/1996 | Fistner et al. | 106/19 | 5,960,880 A | 10/1999 | Nguyen et al. | 166/280 |
| 5,499,678 A | 3/1996 | Surjaatmadja et al. | 166/298 | 5,964,291 A | 10/1999 | Bourne et al. | 166/279 |
| 5,501,275 A | 3/1996 | Card et al. | 166/280 | 5,969,006 A | 10/1999 | Onan et al. | 523/166 |
| 5,505,787 A | 4/1996 | Yamaguchi | 134/4 | 5,977,283 A | 11/1999 | Rossitto | 582/44 |
| 5,512,071 A | 4/1996 | Yam et al. | 51/307 | 5,994,785 A | 11/1999 | Higuchi et al. | 527/789 |
| 5,520,250 A | 5/1996 | Harry et al. | 166/278 | RE36,466 E | 12/1999 | Nelson et al. | 166/280 |
| 5,522,460 A | 6/1996 | Shu | 166/295 | 6,003,600 A | 12/1999 | Nguyen et al. | 166/281 |
| 5,529,123 A | 6/1996 | Carpenter et al. | 166/293 | 6,004,400 A | 12/1999 | Bishop et al. | 134/2 |
| 5,531,274 A | 7/1996 | Bienvenu, Jr. | 166/280 | 6,006,835 A | 12/1999 | Onan et al. | 166/295 |
| 5,536,807 A | 7/1996 | Gruber et al. | 528/354 | 6,006,836 A | 12/1999 | Chatterji et al. | 166/295 |
| 5,545,824 A | 8/1996 | Stengel et al. | 524/590 | 6,012,524 A | 1/2000 | Chatterji et al. | 166/295 |
| 5,547,023 A | 8/1996 | McDaniel et al. | 166/280 | 6,016,870 A | 1/2000 | Dewprashad et al. | 166/295 |
| 5,551,513 A | 9/1996 | Suries et al. | 166/275 | 6,024,170 A | 2/2000 | McCabe et al. | 166/300 |
| 5,551,514 A | 9/1996 | Nelson et al. | 166/280 | 6,028,113 A | 2/2000 | Scepanski | 514/643 |
| 5,582,249 A | 12/1996 | Caveny et al. | 166/276 | 6,028,534 A | 2/2000 | Ciglenec et al. | 340/856.2 |
| 5,582,250 A | 12/1996 | Constein | 166/280 | 6,040,398 A | 3/2000 | Kinsho et al. | 525/527 |
| 5,588,488 A | 12/1996 | Vijn et al. | 166/293 | 6,047,772 A | 4/2000 | Weaver et al. | 166/276 |
| 5,591,700 A | 1/1997 | Harris et al. | 507/204 | 6,059,034 A | 5/2000 | Rickards et al. | 166/280 |
| 5,594,095 A | 1/1997 | Gruber et al. | 528/354 | 6,059,035 A | 5/2000 | Chatterji et al. | 166/293 |
| 5,595,245 A | 1/1997 | Scott, III | 166/250.1 | 6,059,036 A | 5/2000 | Chatterji et al. | 166/294 |
| 5,597,784 A | 1/1997 | Sinclair et al. | | 6,068,055 A | 5/2000 | Chatterji et al. | 166/293 |
| 5,604,184 A | 2/1997 | Ellis et al. | 507/117 | 6,069,117 A | 5/2000 | Onan et al. | 507/202 |
| 5,604,186 A | 2/1997 | Hunt et al. | 507/204 | 6,074,739 A | 6/2000 | Katagiri | 428/323 |
| 5,609,207 A | 3/1997 | Dewprashad et al. | 166/276 | 6,079,492 A | 6/2000 | Hoogteijling et al. | 166/276 |
| 5,620,049 A | 4/1997 | Gipson et al. | 166/248 | 6,098,711 A | 8/2000 | Chatterji et al. | 166/294 |
| 5,639,806 A | 6/1997 | Johnson et al. | 523/208 | 6,114,410 A | 9/2000 | Betzold | 523/130 |
| 5,670,473 A | 9/1997 | Scepanski | 510/445 | 6,123,871 A | 9/2000 | Carroll | 252/301.36 |
| 5,692,566 A | 12/1997 | Surles | 166/295 | 6,123,965 A | 9/2000 | Jacob et al. | 424/489 |
| 5,697,440 A | 12/1997 | Weaver et al. | 166/281 | 6,124,246 A | 9/2000 | Heathman et al. | 507/219 |
| 5,698,322 A | 12/1997 | Tsai et al. | 428/373 | 6,130,286 A | 10/2000 | Thomas et al. | 524/507 |
| 5,712,314 A | 1/1998 | Surles et al. | 521/41 | 6,135,987 A | 10/2000 | Tsai et al. | 604/365 |
| 5,732,364 A | 3/1998 | Kalb et al. | 588/8 | 6,140,446 A | 10/2000 | Fujiki et al. | 528/15 |
| 5,765,642 A | 6/1998 | Surjaatmadja | 166/297 | 6,148,911 A | 11/2000 | Gipson et al. | 166/248 |
| 5,775,425 A | 7/1998 | Weaver et al. | 166/276 | 6,152,234 A | 11/2000 | Newhouse et al. | 166/403 |
| 5,782,300 A | 7/1998 | James et al. | 166/278 | 6,162,766 A | 12/2000 | Muir et al. | 507/267 |
| 5,783,822 A | 7/1998 | Buchanan et al. | 250/259 | 6,169,058 B1 | 1/2001 | Le et al. | 507/222 |
| 5,787,986 A | 8/1998 | Weaver et al. | 166/280 | 6,172,011 B1 | 1/2001 | Card et al. | 507/204 |
| 5,791,415 A | 8/1998 | Nguyen et al. | 166/280 | 6,172,077 B1 | 1/2001 | Curtis et al. | 514/278 |
| 5,799,734 A | 9/1998 | Norman et al. | 166/278 | 6,176,315 B1 | 1/2001 | Reddy et al. | 166/295 |
| 5,806,593 A | 9/1998 | Suries | 166/270 | 6,177,484 B1 | 1/2001 | Surles | 523/131 |
| 5,830,987 A | 11/1998 | Smith | 528/332 | 6,184,311 B1 | 2/2001 | O'Keefe et al. | 525/438 |
| 5,833,000 A | 11/1998 | Weaver et al. | 166/276 | 6,187,834 B1 | 2/2001 | Thayer et al. | 522/15 |
| 5,833,361 A | 11/1998 | Funk | 366/80 | 6,187,839 B1 | 2/2001 | Eoff et al. | 523/130 |
| 5,836,391 A | 11/1998 | Jonasson et al. | 166/295 | 6,189,615 B1 | 2/2001 | Sydansk | 166/270 |
| 5,836,392 A | 11/1998 | Urlwin-Smith | 166/295 | 6,192,985 B1 | 2/2001 | Hinkel et al. | 166/280 |
| 5,837,656 A | 11/1998 | Sinclair et al. | 507/220 | 6,192,986 B1 | 2/2001 | Urlwin-Smith | 166/295 |
| 5,837,785 A | 11/1998 | Kinsho et al. | 525/527 | 6,196,317 B1 | 3/2001 | Hardy | 166/295 |
| 5,839,510 A | 11/1998 | Weaver et al. | 166/276 | 6,202,751 B1 | 3/2001 | Chatterji et al. | 166/276 |
| 5,840,784 A | 11/1998 | Funkhouser et al. | 523/130 | 6,209,643 B1 | 4/2001 | Nguyen et al. | 166/276 |
| 5,849,401 A | 12/1998 | El-Afandi et al. | 428/215 | 6,209,646 B1 | 4/2001 | Reddy et al. | 166/300 |
| 5,849,590 A | 12/1998 | Anderson, II et al. | 436/27 | 6,210,471 B1 | 4/2001 | Craig | 106/31.08 |
| 5,853,048 A | 12/1998 | Weaver et al. | 166/279 | 6,214,773 B1 | 4/2001 | Harris et al. | 507/271 |
| 5,864,003 A | 1/1999 | Qureshi et al. | 528/141 | 6,231,664 B1 | 5/2001 | Chatterji et al. | 106/724 |
| 5,865,936 A | 2/1999 | Edelman et al. | 156/310 | 6,234,251 B1 | 5/2001 | Chatterji et al. | 166/295 |
| 5,871,049 A | 2/1999 | Weaver et al. | 166/276 | 6,238,597 B1 | 5/2001 | Yim et al. | 252/512 |
| 5,873,413 A | 2/1999 | Chatterji et al. | 166/293 | 6,241,019 B1 | 6/2001 | Davidson et al. | 166/249 |
| 5,875,844 A | 3/1999 | Chatterji et al. | 166/293 | 6,242,390 B1 | 6/2001 | Mitchell et al. | 507/211 |
| 5,875,845 A | 3/1999 | Chatterji et al. | 166/293 | 6,244,344 B1 | 6/2001 | Chatterji et al. | 166/295 |
| 5,875,846 A | 3/1999 | Chatterji et al. | 166/293 | 6,257,335 B1 | 7/2001 | Nguyen et al. | 166/280 |
| 5,893,383 A | 4/1999 | Fracteau | 137/14 | 6,260,622 B1 | 7/2001 | Blok et al. | 166/305.1 |
| 5,893,416 A | 4/1999 | Read | 166/304 | 6,271,181 B1 | 8/2001 | Chatterji et al. | 507/219 |
| 5,908,073 A | 6/1999 | Nguyen et al. | 166/276 | 6,274,650 B1 | 8/2001 | Cui | 523/457 |
| 5,911,282 A | 6/1999 | Onan et al. | 175/72 | 6,279,652 B1 | 8/2001 | Chatterji et al. | 166/194 |
| 5,916,933 A | 6/1999 | Johnson et al. | 523/208 | 6,279,656 B1 | 8/2001 | Sinclair et al. | 166/310 |
| 5,921,317 A | 7/1999 | Dewprashad et al. | 166/208 | 6,283,214 B1 | 9/2001 | Guinot et al. | 166/297 |
| 5,924,488 A | 7/1999 | Nguyen et al. | 166/280 | 6,302,207 B1 | 10/2001 | Nguyen et al. | 166/276 |
| 5,929,437 A | 7/1999 | Elliott et al. | 250/259 | 6,306,998 B1 | 10/2001 | Kimura et al. | 528/12 |

| | | | |
|---|---|---|---|
| 6,311,773 B1 | 11/2001 | Todd et al. ................. 166/280 |
| 6,321,841 B1 | 11/2001 | Eoff et al. .................. 166/291 |
| 6,323,307 B1 | 11/2001 | Bigg et al. .................. 528/354 |
| 6,326,458 B1 | 12/2001 | Gruber et al. .............. 528/354 |
| 6,328,105 B1 | 12/2001 | Betzold ...................... 166/280 |
| 6,328,106 B1 | 12/2001 | Griffith et al. ............. 166/295 |
| 6,330,916 B1 | 12/2001 | Rickards et al. ............ 166/280 |
| 6,330,917 B2 | 12/2001 | Chatterji et al. ............ 166/295 |
| 6,350,309 B2 | 2/2002 | Chatterji et al. ............ 106/677 |
| 6,357,527 B1 | 3/2002 | Norman et al. .............. 166/300 |
| 6,364,018 B1 | 4/2002 | Brannon et al. ......... 166/280.2 |
| 6,364,945 B1 | 4/2002 | Chatterji et al. ............ 106/677 |
| 6,367,165 B1 | 4/2002 | Huttlin ........................ 34/582 |
| 6,367,549 B1 | 4/2002 | Chatterji et al. ............ 166/292 |
| 6,372,678 B1 | 4/2002 | Youngsman et al. ....... 504/128 |
| 6,376,571 B1 | 4/2002 | Chawla et al. ............. 522/64 |
| 6,387,986 B1 | 5/2002 | Moradi-Araghi et al. ... 523/211 |
| 6,390,195 B1 | 5/2002 | Nguyen et al. ............. 166/276 |
| 6,401,817 B1 | 6/2002 | Griffith et al. ............. 166/295 |
| 6,405,797 B2 | 6/2002 | Davidson et al. ........... 166/249 |
| 6,406,789 B1 | 6/2002 | McDaniel et al. .......... 428/403 |
| 6,408,943 B1 | 6/2002 | Schultz et al. ............. 166/285 |
| 6,422,314 B1 | 7/2002 | Todd et al. ................. 166/312 |
| 6,439,309 B1 | 8/2002 | Matherly et al. ........... 166/276 |
| 6,439,310 B1 | 8/2002 | Scott, III et al. ........... 166/308 |
| 6,440,255 B1 | 8/2002 | Kohlhammer et al. ...... 156/283 |
| 6,446,727 B1 | 9/2002 | Zemlak et al. ............. 166/308 |
| 6,448,206 B1 | 9/2002 | Griffith et al. ............. 507/219 |
| 6,450,260 B1 | 9/2002 | James et al. ................ 166/277 |
| 6,454,003 B1 | 9/2002 | Chang et al. ............... 166/275 |
| 6,485,947 B1 | 11/2002 | Rajgarhia et al. ........... 435/139 |
| 6,488,091 B1 | 12/2002 | Weaver et al. .............. 166/300 |
| 6,488,763 B2 | 12/2002 | Brothers et al. ............ 106/692 |
| 6,494,263 B2 | 12/2002 | Todd .......................... 166/312 |
| 6,503,870 B2 | 1/2003 | Griffith et al. ............. 507/219 |
| 6,508,305 B1 | 1/2003 | Brannon et al. ............. 166/293 |
| 6,527,051 B1 | 3/2003 | Reddy et al. ............... 166/300 |
| 6,528,157 B1 | 3/2003 | Hussain et al. ............. 428/325 |
| 6,531,427 B1 | 3/2003 | Shuchart et al. ............ 507/267 |
| 6,538,576 B1 | 3/2003 | Schultz et al. ........... 340/859.6 |
| 6,543,545 B1 | 4/2003 | Chatterji et al. ............ 166/381 |
| 6,552,333 B1 | 4/2003 | Storm et al. ............. 250/269.3 |
| 6,554,071 B1 | 4/2003 | Reddy et al. ............... 166/293 |
| 6,555,507 B2 | 4/2003 | Chatterji et al. ............ 507/219 |
| 6,569,814 B1 | 5/2003 | Brady et al. ................ 507/201 |
| 6,575,243 B2 * | 6/2003 | Pabst .................... 166/250.08 |
| 6,582,819 B2 | 6/2003 | McDaniel et al. .......... 428/402 |
| 6,593,402 B2 | 7/2003 | Chatterji et al. ............ 524/7 |
| 6,599,863 B1 | 7/2003 | Palmer et al. .............. 507/219 |
| 6,608,162 B1 | 8/2003 | Chiu et al. .................. 528/129 |
| 6,616,320 B2 | 9/2003 | Huber et al. ............. 366/156.2 |
| 6,620,857 B2 | 9/2003 | Valet .......................... 522/42 |
| 6,626,241 B2 | 9/2003 | Nguyen ...................... 166/278 |
| 6,632,527 B1 * | 10/2003 | McDaniel et al. .......... 428/402 |
| 6,632,892 B2 | 10/2003 | Rubinsztajn et al. ....... 525/476 |
| 6,642,309 B2 | 11/2003 | Komitsu et al. ............ 525/100 |
| 6,648,501 B2 | 11/2003 | Huber et al. ................ 366/301 |
| 6,659,179 B2 | 12/2003 | Nguyen ...................... 166/227 |
| 6,664,343 B2 | 12/2003 | Narisawa et al. ........... 525/474 |
| 6,667,279 B1 | 12/2003 | Hessert et al. .............. 507/225 |
| 6,668,926 B2 | 12/2003 | Nguyen et al. ............. 166/280 |
| 6,669,771 B2 | 12/2003 | Tokiwa et al. ........... 106/162.7 |
| 6,681,856 B1 | 1/2004 | Chatterji et al. ............ 166/294 |
| 6,686,328 B1 | 2/2004 | Binder ....................... 510/446 |
| 6,705,400 B1 | 3/2004 | Nguyen et al. ............. 166/281 |
| 6,710,019 B1 | 3/2004 | Sawdon et al. ............. 507/136 |
| 6,713,170 B1 | 3/2004 | Kaneko et al. ............. 428/323 |
| 6,725,931 B2 | 4/2004 | Nguyen et al. .......... 166/280.2 |
| 6,729,404 B2 | 5/2004 | Nguyen et al. .......... 166/280.2 |
| 6,732,800 B2 | 5/2004 | Acock et al. ............... 166/308 |
| 6,745,159 B1 | 6/2004 | Todd et al. ................. 703/10 |
| 6,749,025 B1 | 6/2004 | Brannon et al. .......... 166/305.1 |
| 6,763,888 B1 | 7/2004 | Harris et al. ............. 166/305.1 |
| 6,766,858 B2 | 7/2004 | Nguyen et al. ............. 166/300 |
| 6,776,236 B1 | 8/2004 | Nguyen ...................... 166/279 |
| 6,832,650 B2 | 12/2004 | Nguyen et al. ............. 166/279 |
| 6,851,474 B2 | 2/2005 | Nguyen ...................... 166/276 |
| 6,887,834 B2 | 5/2005 | Nguyen et al. ............. 507/221 |
| 6,978,836 B2 | 12/2005 | Nguyen et al. ............. 166/295 |
| 2001/0016562 A1 | 8/2001 | Muir et al. .................. 507/201 |
| 2002/0043370 A1 | 4/2002 | Poe ........................ 166/250.07 |
| 2002/0048676 A1 | 4/2002 | McDaniel et al. .......... 428/404 |
| 2002/0070020 A1 | 6/2002 | Nguyen ...................... 166/295 |
| 2003/0006036 A1 | 1/2003 | Malone et al. .......... 166/250.12 |
| 2003/0060374 A1 | 3/2003 | Cooke, Jr. ................... 507/200 |
| 2003/0114314 A1 | 6/2003 | Ballard et al. .............. 507/100 |
| 2003/0130133 A1 | 7/2003 | Vollmer ..................... 507/100 |
| 2003/0148893 A1 | 8/2003 | Lungofer et al. ............ 507/200 |
| 2003/0186820 A1 | 10/2003 | Thesing ...................... 507/200 |
| 2003/0188766 A1 | 10/2003 | Banerjee et al. ............ 134/7 |
| 2003/0188872 A1 | 10/2003 | Nguyen et al. ............. 166/308 |
| 2003/0196805 A1 | 10/2003 | Boney et al. ............... 166/280 |
| 2003/0205376 A1 | 11/2003 | Ayoub et al. ............ 166/254.2 |
| 2003/0230408 A1 | 12/2003 | Acock et al. ............... 166/297 |
| 2003/0234103 A1 | 12/2003 | Lee et al. .................... 166/293 |
| 2004/0000402 A1 | 1/2004 | Nguyen et al. ............. 166/280 |
| 2004/0014607 A1 | 1/2004 | Sinclair et al. ............. 507/200 |
| 2004/0014608 A1 | 1/2004 | Nguyen et al. ............. 507/200 |
| 2004/0040706 A1 | 3/2004 | Hossaini et al. ............ 166/278 |
| 2004/0040708 A1 | 3/2004 | Stephenson et al. ..... 166/280.1 |
| 2004/0040713 A1 | 3/2004 | Nguyen et al. ............. 166/295 |
| 2004/0048752 A1 | 3/2004 | Nguyen et al. ............. 507/269 |
| 2004/0055747 A1 | 3/2004 | Lee ............................ 166/278 |
| 2004/0106525 A1 | 6/2004 | Wilbert et al. .............. 507/269 |
| 2004/0138068 A1 | 7/2004 | Rimmer et al. ............. 507/100 |
| 2004/0149441 A1 | 8/2004 | Nguyen et al. .......... 166/280.1 |
| 2004/0152601 A1 | 8/2004 | Still et al. ................... 507/100 |
| 2004/0152602 A1 | 8/2004 | Boles ......................... 507/100 |
| 2004/0177961 A1 | 9/2004 | Nguyen ................... 166/280.2 |
| 2004/0194961 A1 | 10/2004 | Nguyen et al. ............. 166/295 |
| 2004/0206499 A1 | 10/2004 | Nguyen et al. .......... 166/280.2 |
| 2004/0211559 A1 | 10/2004 | Nguyen et al. ............. 166/276 |
| 2004/0211561 A1 | 10/2004 | Nguyen et al. .......... 166/280.2 |
| 2004/0221992 A1 | 11/2004 | Nguyen et al. ............. 166/295 |
| 2004/0231845 A1 | 11/2004 | Cooke, Jr. ................... 166/279 |
| 2004/0231847 A1 | 11/2004 | Nguyen et al. ............. 166/295 |
| 2004/0256099 A1 | 12/2004 | Nguyen et al. ............. 166/249 |
| 2004/0261995 A1 | 12/2004 | Nguyen et al. ............. 166/279 |
| 2004/0261997 A1 | 12/2004 | Nguyen et al. ............. 166/281 |
| 2005/0000731 A1 | 1/2005 | Nguyen et al. .............. 175/57 |
| 2005/0006093 A1 | 1/2005 | Nguyen ...................... 166/281 |
| 2005/0006095 A1 | 1/2005 | Justus et al. ................ 166/295 |
| 2005/0006096 A1 | 1/2005 | Nguyen et al. ............. 166/295 |
| 2005/0034862 A1 | 2/2005 | Nguyen et al. ............. 166/281 |
| 2005/0045326 A1 | 3/2005 | Nguyen ...................... 166/278 |

FOREIGN PATENT DOCUMENTS

| | | |
|---|---|---|
| EP | 0313243 B1 | 10/1988 |
| EP | 0528595 A1 | 8/1992 |
| EP | 0 510 762 A2 | 10/1992 |
| EP | 0643196 A2 | 6/1994 |
| EP | 0834644 A2 | 4/1998 |
| EP | 0853186 A2 | 7/1998 |
| EP | 0864726 A2 | 9/1998 |
| EP | 0 879 935 A2 | 11/1998 |
| EP | 0933498 A1 | 8/1999 |
| EP | 0 879 935 A3 | 10/1999 |
| EP | 1001133 A1 | 5/2000 |
| EP | 1132569 A2 | 9/2001 |
| EP | 1326003 A1 | 7/2003 |
| EP | 1362978 A1 | 11/2003 |
| EP | 1394355 A1 | 3/2004 |
| EP | 1396606 A2 | 3/2004 |
| EP | 1398640 A1 | 3/2004 |
| EP | 1403466 A2 | 3/2004 |

| | | |
|---|---|---|
| EP | 1464789 A1 | 10/2004 |
| GB | 1107584 | 3/1968 |
| GB | 1264180 | 12/1969 |
| GB | 1292718 | 10/1972 |
| GB | 2382143 | 4/2001 |
| WO | WO 93/15127 | 8/1993 |
| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 99/27229 | 6/1999 |
| WO | WO 01/81914 | 11/2001 |
| WO | WO 01/87797 A1 | 11/2001 |
| WO | WO 02/12674 A1 | 2/2002 |
| WO | WO 03/027431 A2 | 4/2003 |
| WO | WO 03/027431 A3 | 4/2003 |
| WO | WO 2004/037946 A1 | 5/2004 |
| WO | WO 2004/038176 A1 | 5/2004 |
| WO | WO 2005/021928 A2 | 3/2005 |

OTHER PUBLICATIONS

U.S. Appl. No. 10/650,063, filed Aug. 26, 2003, Nguyen.
U.S. Appl. No. 10/650,064, filed Aug. 26, 2003, Nguyen et al.
U.S. Appl. No. 10/650,065, filed Aug. 26, 2003, Nguyen.
U.S. Appl. No. 10/659,574, filed Sep. 10, 2003, Nguyen et al.
U.S. Appl. No. 10/751,593, filed Jan. 5, 2004, Nguyen.
U.S. Appl. No. 10/775,347, filed Feb. 10, 2004, Nguyen.
U.S. Appl. No. 10/791,944, filed Mar. 3, 2004, Nguyen.
U.S. Appl. No. 10/793,711, filed Mar. 5, 2004, Nguyen et al.
U.S. Appl. No. 10/852,811, filed May 25, 2004, Nguyen.
U.S. Appl. No. 10/860,951, filed Jun. 4, 2004, Stegent et al.
U.S. Appl. No. 10/861,829, filed Jun. 4, 2004, Stegent et al.
U.S. Appl. No. 10/862,986, filed Jun. 8, 2004, Nguyen et al.
U.S. Appl. No. 10/864,061, filed Jun. 9, 2004, Blauch et al.
U.S. Appl. No. 10/864,618, filed Jun. 9, 2004, Blauch et al.
U.S. Appl. No. 10/868,593, filed Jun. 15, 2004, Nguyen et al.
U.S. Appl. No. 10/868,608, filed Jun. 15, 2004, Nguyen et al.
U.S. Appl. No. 10/937,076, filed Sep. 9, 2004, Nguyen et al.
U.S. Appl. No. 10/944,973, filed Sep. 20, 2004, Nguyen et al.
U.S. Appl. No. 10/972,648, filed Oct. 25, 2004, Dusterhoft et al.
U.S. Appl. No. 10/977,673, filed Oct. 29, 2004, Nguyen.
U.S. Appl. No. 11/009,277, filed Dec. 8, 2004, Welton et al.
U.S. Appl. No. 11/011,394, filed Dec. 12, 2004, Nguyen et al.
U.S. Appl. No. 11/035,833, filed Jan. 14, 2005, Nguyen.
U.S. Appl. No. 11/049,252, filed Feb. 2, 2005, Van Batenburg et al.
U.S. Appl. No. 11/053,280, filed Feb. 8, 2005, Nguyen.
U.S. Appl. No. 11/056,635, filed Feb. 11, 2005, Dusterhoft et al.
Simmons, et al., *Poly(phenyllactide): Synthesis, Characterization, and Hydrolytic Degradation*, Biomacromolecules, vol. 2, No. 2, 2001 (pp. 658-663).
Yin, et al., *Preparation and Characterization of Substituted Polyactides*, American Chemical Society, vol. 32, No. 23, 1999 (pp. 7711-7718).
Yin, et al., *Synthesis and Properties of Polymers Derived form Substituted Lactic Acids*, American Chemical Society, Ch. 12, 2001 (pp. 147-159).
Cantu, et al, *Laboratory and Field Evaluation of a Combined Fluid-Loss-Control Additive and Gel Breaker for Fracturing Fluids*, SPE 18211, Society of Petroleum Engineers, 1990.
Love, et al, *Selectively Placing Many Fractures in Openhole Horizontal Wells Improves Production*, SPE 50422, Society of Petroleum Engineers, 1998.
McDaniel, et al, *Evolving New Stimulation Process Proves Highly Effective in Level 1 Dual-Lateral Completion*, SPE 78697, Society of Petroleum Engineers, 2002.
Albertsson, et al, *Aliphatic Polyesters: Synthesis, Properties and Applications*, Advances in Polymer Science, vol. 157, Degradable Aliphatic Polyesters, 2002.
Dechy-Cabaret, et al, *Controlled Ring-Opening Polymerization of Lactide and Glycolide*, American Chemical Society, Chemical Reviews, A-Z, AA-AD, received 2004.

Funkhouser, et al, *Synthetic Polymer Fracturing Fluid for High-Temperature Applications*, SPE 80236, Society of Petroleum Engineers, 2003.
*Chelating Agents*, Encyclopedia of Chemical Technology, vol. 5 (764-795).
Vichaibun, et al, *A New Assay for the Enzymatic Degradation of Polyactic Acid, Short Report*, ScienceAsia, vol. 29, 2003 (pp. 297-300).
Halliburton, *SurgiFrac$^{SM}$ Service, A Quick and Cost-Effective Method to Help Boost Production From Openhole Horizontal Completions*, Halliburton Communications, HO3297, 2002.
Halliburton, *Cobra Frac$^{SM}$ Service, Coiled Tubing Fracturing—Cost-Effective Method for Stimulating Untapped Reserves*, HO2319R, Halliburton Energy Services, 2000.
Halliburton, *CobraJet Frac$^{SM}$ Service, Cost-effective Technology That Can Help Reduce Cost Per BOE Produced, Shorten Cycle Time and Reduce Capex*, Halliburton Communications.
CDX Gas, *CDX Solution*, 2003, CDX, LLC, available @ www.cdxgas.com/solution.html, printed pp.1-2.
CDX Gas, *What is Coalbed Methane?*, 2003, CDX, LLC, available @ www.cdxgas.com/what.html, printed p. 1.
Halliburton, *CoalStim$^{SM}$ Service, Helps Boost Cash Flow From CBM Assets*, Stimulation, HO3679 Oct. 2003, Halliburton Communications.
Halliburton, *Conductivity Endurance Technology For High Permeability Reservoirs, Helps Prevent Intrusion of Formation Material Into the Proppant Pack for Improved Long-term Production*, Stimulation, 2003, Halliburton Communications.
Halliburton, *Expedite® Service, A Step-Change Improvement Over Conventional Proppant Flowback Control Systems. Provides Up to Three Times the Conductivity of RCPs.*, Stimulation, HO3296 May 2004, Halliburton Communications.
Halliburton, *SandWedge® NT Conductivity Enhancement System, Enhances Proppant Pack Conductivity and Helps Prevent Intrusion of Formation Material for Improved Long-Term Production*, Stimulation, HO2289 May 2004, Halliburton Communications.
S. W. Almond, et al., "*Factors Affecting Proppant Flowback With Resin Coated Proppants,*" Society of Petroleum Engineers, Inc., SPE 30096, p. 171-186, 1995.
U.S. Appl. No. 10/383,154, filed Mar. 6, 2003, Nguyen, et al.
U.S. Appl. No. 10/394,898, filed Mar. 21, 2003, Eoff et al.
U.S. Appl. No. 10/408,800, filed Apr. 7, 2003, Nguyen, et al.
U.S. Appl. No. 10/601,407, filed Jun. 23, 2003, Byrd et al.
U.S. Appl. No. 10/603,492, filed Jun. 25, 2003, Nguyen, et al.
U.S. Appl. No. 10/727,365, filed Dec. 4, 2003, Reddy, et al.
U.S. Appl. No. 10/853,879, filed May 26, 2004, Nguyen et al.
Halliburton Technical Flier—Multi Stage Frac Completion Methods, 2 pages.
Halliburton Cobra Frac Advertisement, 2001.
Nguyen et al., *A Novel Approach For Enhancing Proppant Consolidation: Laboratoy Testing And Field Applications*, SPE Paper No. 77748, 2002.
SPE 15547, *Field Application of Lignosulfonate Gels To Reduce Channeling*, South Swan Hills Miscible Unit, Alberta, Canada, by O.R. Wagner et al., 1986.
Owens et al., *Waterflood Pressure Pulsing for Fractured Reservoirs*SPE 1123, 1966.
Felsenthal et al., *Pressure Pulsing—An Improved Method of Waterflooding Fractured Reservoirs*SPE 1788, 1957.
Raza, "*Water and Gas Cyclic Pulsing Method for Improved Oil Recovery*", SPE 3005, 1971.
Peng et al., "*Pressure Pulsing Waterflooding in Dual Porosity Naturally Fractured Reservoirs*" SPE 17587, 1988.
Dusseault et al, "*Pressure Pulse Workovers in Heavy Oil*", SPE 79033, 2002.
Yang et al., "*Experimental Study on Fracture Initiation By Pressure Pulse*", SPE 63035, 2000.
Nguyen et al., *New Guidelines For Applying Curable Resin-Coated Proppants*, SPE Paper No. 39582, 1997.
Kazakov et al., "*Optimizing and Managing Coiled Tubing Frac Strings*" SPE 60747, 2000.
Advances in Polymer Science, vol. 157, "*Degradable Aliphatic Polyesters*"edited by A.-C. Alberston, 2001.

Gorman, *Plastic Electric: Lining up the Future of Conducting Polymers* Science News, vol. 163, May 17, 2003.

Gidley et al., *"Recent Advances in Hydraulic Fracturing,"* Chapter 6, pp. 109-130, 1989.

Halliburton brochure entitled "H2Zero™ Service Introducing The Next Generation of cost-Effective Conformance Control Solutions", 2002.

Halliburton brochure entitled " "INJECTROL® A Component:, 1999.

Halliburton brochure entitled "INJECTROL® G Sealant", 1999.

Halliburton brochure entitled "INJECTROL® IT Sealant", 1999.

Halliburton brochure entitled "INJECTROL® Service Treatment", 1999.

Halliburton brochure entitled "INJECTROL® U Sealant", 1999.

Halliburton brochure entitled "Sanfix® A Resin", 1999.

Halliburton brochure entitled "Pillar Frac Stimulation Technique" Fracturing Services Technical Data Sheet, 2 pages.

Foreign search report and opinion (CPW 21582 EP), Mar. 11, 2005.

* cited by examiner

METHODS RELATING TO MAINTAINING THE STRUCTURAL INTEGRITY OF DEVIATED WELL BORES

BACKGROUND

The present invention relates to subterranean operations involving deviated well bores, and more particularly, to methods of maintaining the structural integrity and conductivity of deviated well bores.

A deviated well bore, as that term is used herein, refers to a well bore that is not substantially vertical. The term "deviated well bore," as the term is used herein, also includes horizontal well bores. Deviated well bores are becoming more prevalent, because in part, they allow one rig and well head to drill and produce from a much larger reservoir area than a more traditional vertical well bore. Thus, deviated well bores are often an attractive option for producing desirable fluids from subterranean formations such as, for example, hydrocarbons from oil and gas reservoirs.

Figure 1:
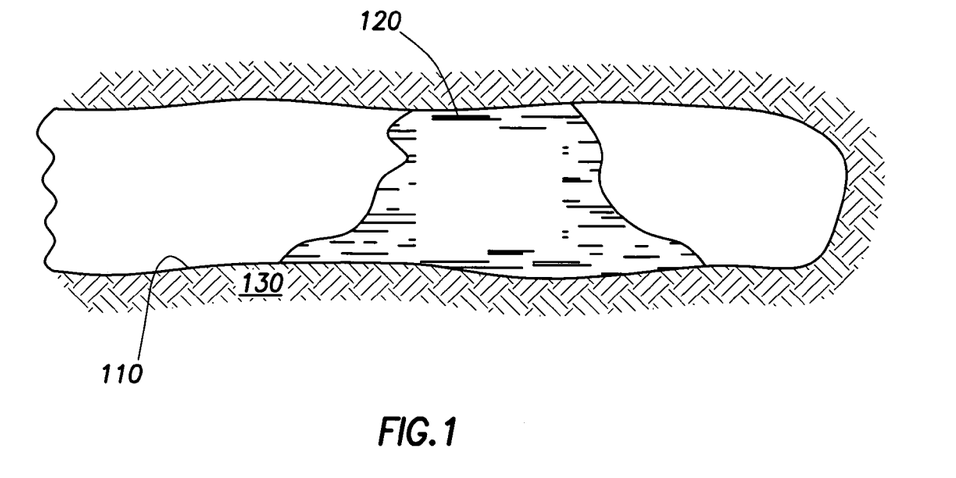
FIG. 1 shows a cross-sectional view of a deviated well bore illustrating a partial open hole collapse potentially obstructing the production of desirable fluids from the surrounding subterranean formation.

Although deviated well bores provide a variety of advantages, unfortunately, they can also present some serious drawbacks. One drawback of deviated well bores is that they can be prone, in some cases, to structural weaknesses relative to vertical well bores. Moreover, inserting and placing well bore casing in deviated well bores to counteract these potential weaknesses is often impractical and technically complex. Further, placing casing in a deviated well bore can be prohibitively expensive. As a result, many deviated well bores are simply left as open holes without any casing that might provide structural support, which may allow the deviated well bore to fail or collapse, which is undesirable. Well bore structural failures are extremely disadvantageous, because such failures can negatively affect the conductivity of the well bore among other problems. In some cases, a failure or collapse of a deviated well bore can result in a total production blockage of hydrocarbons or other desirable fluids from the well bore. Solely for illustrative purposes, FIG. 1 shows an example of a failed deviated well bore 110 with a partial open hole collapse 120 obstructing the production of hydrocarbons from the surrounding subterranean formation 130.

An example of one type of deviated well bore that is particularly prone to collapse is one penetrating a coal bed formation. Coal bed formations are particularly friable and fractured and, as such, are prone to collapse. Moreover, inserting casing in a coal bed formation to counteract the propensity for well bore collapse can potentially lead to an undesirable explosion because of the frequent presence of methane therein.

Another example of a deviated well bore that is particularly prone to structural failure is one that has been subjected to previous stimulation operations. Stimulation or fracturing operations can disturb a formation in such a way as to induce shifts or perturbations in the formation, thus leading to a greater risk of a structural failure of any type of deviated well bore drilled therein.

SUMMARY

The present invention relates to subterranean operations involving deviated well bores, and more particularly, to methods of maintaining the structural integrity and conductivity of deviated well bores.

An example of a method of enhancing at least partially the structural integrity of a longitudinal portion of a deviated well bore comprises providing a gravel matrix composition that comprises particulates having an average particle size of about 20 mesh or larger; providing a longitudinal portion of a deviated well bore; and placing a sufficient amount of the gravel matrix composition in the longitudinal portion to enhance the structural support of the longitudinal portion of the deviated well bore.

Another example of a method of enhancing at least partially the structural integrity of a longitudinal portion of a deviated well bore comprises providing a gravel matrix composition that comprises particulates and a curable resin; providing a longitudinal portion of a deviated well bore; placing a sufficient amount of the gravel matrix composition in the longitudinal portion to enhance the structural support of the longitudinal portion; allowing the curable resin to cure; allowing the gravel matrix composition to form; and producing fluids through the gravel matrix composition.

Another example of a method of enhancing at least partially the structural integrity of a longitudinal portion of a deviated well bore comprises providing a gravel matrix composition that comprises particulates and a tackifier; providing a longitudinal portion of a deviated well bore; placing a sufficient amount of the gravel matrix composition in the longitudinal portion to enhance the structural support of the longitudinal portion; allowing the gravel matrix composition to form; and producing fluids through the gravel matrix composition.

The objects, features, and advantages of the present invention will be readily apparent to those skilled in the art upon a reading of the description of preferred embodiments which follows.

BRIEF DESCRIPTION OF THE DRAWINGS

A more complete understanding of the present disclosure and advantages thereof may be acquired by referring to the following description taken in conjunction with the accompanying drawings, wherein.

While the present invention is susceptible to various modifications and alternative forms, some embodiments thereof have been shown in the drawings and are herein described. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION

The present invention relates to subterranean operations involving deviated well bores, and more particularly, to methods of maintaining the structural integrity and conductivity of deviated well bores.

Figure 2:
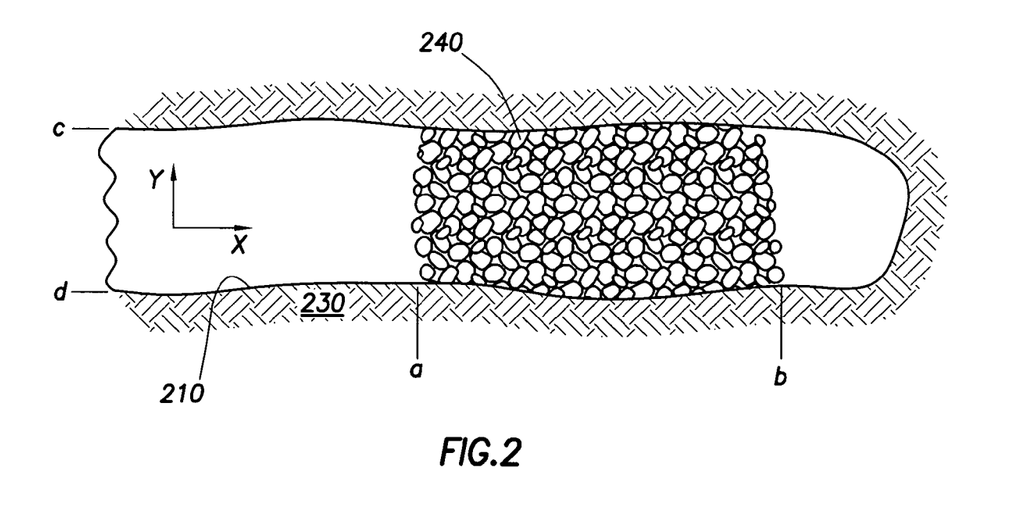
FIG. 2 illustrates a cross-sectional view showing the placement of a gravel matrix composition in a longitudinal portion of a deviated well bore in accordance with an embodiment of the present invention.

To aid in describing certain aspects of the present invention, the terms "longitudinal" and "transverse" relative to a given deviated well bore are used herein. The "longitudinal axis" of a deviated well bore, as the term is used herein, refers to the direction in which the well bore is drilled. By contrast, the "transverse axis" of a deviated well bore, as the term is used herein, refers to the axis generally perpendicular to the longitudinal axis of the deviated well bore. Referring now to FIG. 2, as an example of the use of these terms, the axis X refers to the longitudinal axis of the deviated well bore. The axis Y refers to the transverse axis of the deviated well bore. An example of a longitudinal distance in a deviated well bore is illustrated in FIG. 2 as the distance spanning from a to b. An example of a transverse distance in a deviated well bore is illustrated in FIG. 2 as the distance spanning from c to d. As one skilled in the art will appreciate, the longitudinal axis and the transverse axis of a well bore may change direction as the direction of the well bore changes throughout the length of the well bore. Thus, a "longitudinal portion" of a deviated well bore, as the term is used herein, refers to any chosen length along the longitudinal axis of the deviated well bore.

In certain embodiments, the present invention provides methods useful for maintaining the structural integrity of a longitudinal portion of a deviated well bore while maintaining the conductivity thereof by placing a sufficient amount of a gravel matrix composition in a chosen longitudinal portion of the deviated well bore to enhance, at least to some degree, the structural support thereof.

FIG. 2 illustrates the placement of a gravel matrix composition 240 in a chosen longitudinal portion of a deviated well bore 10 in accordance with one embodiment of the present invention. The placement of the gravel matrix composition 240 in a chosen longitudinal portion of the deviated well bore 210 helps prevent a collapse or failure of the walls of the chosen longitudinal portion of the deviated well bore 210 and should permit the production of hydrocarbons through the gravel matrix composition 240 from the formation 230. As shown in FIG. 2, the gravel matrix composition may occupy the transverse distance spanning the walls of the well bore that is not otherwise occupied with other solid matter.

Gravel Particulates Suitable for Use in the Present Invention

In certain embodiments, the gravel matrix composition of the present invention may comprise any particulates suitable for use in subterranean operations. The term "gravel matrix," as the term is used herein, refers to a consolidation of particulates within a well bore in a subterranean formation. The mechanism by which the gravel matrix composition consolidates within the deviated well bore is not important, e.g., through the use of curable resins, tackifying agents, interlocking gravel, and/or by mere placement in the deviated well bore; any suitable method can be used in conjunction with the present invention, including mechanical methods, e.g., interlocking gravel particulates. Suitable particulates include, but are not limited to, sand, bauxite, ceramic materials, glass materials, polymer materials, polytetrafluoroethylene materials, nut shell pieces, seed shell pieces, fruit pit pieces, wood, composite particulates, proppant particulates, and combinations thereof. Suitable composite materials may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof. In certain exemplary embodiments, the particulates may comprise common sand. Suitable particulates may take any shape including, but not limited to, the physical shape of platelets, shavings, flakes, ribbons, rods, strips, spheroids, ellipsoids, toroids, pellets, tablets.

Any variety of particulate size may be useful in the present invention. In certain embodiments, an average particulate size of 40 mesh or larger may be preferred. Placing a gravel matrix composition within a longitudinal portion of a deviated well bore may enhance, at least partially, the structural integrity of that portion of the deviated well bore. For a particular deviated well bore, a person of ordinary skill in the art, with the benefit of this disclosure, will recognize the particulate type, size, and amount to use to achieve a desired result of porosity and structural integrity of the deviated well bore thereby assuring continued permeability in the deviated well bore.

Resins Suitable for Use with the Present Invention

In certain embodiments, the particulates of the gravel matrix composition may optionally be coated or treated with a curable resin. The curable resin may provide, among other benefits, hardening of the particulates and/or consolidation of the particulates of the gravel matrix composition. In some cases, the resin may form a film around the particles, locking the particles into place. In this way, by preventing particulates from slipping past one another, the particulates may resist further compaction, which may preserve and/or improve porosity of the gravel matrix composition. Thus, depending on the type of resin used and the conditions thereof, a curable resin may, to varying extents, improve the structural integrity of the gravel matrix composition and/or improve the conductivity of the gravel matrix composition. The coating process may occur downhole, on the surface, or a combination of both. Further, the coating of the particulates may occur by batch mixing, by continuous "on-the-fly" mixing, or by a combination thereof.

Resins suitable for use in the consolidation fluids of the present invention include all resins known in the art that are capable of forming a hardened, consolidated mass. Many such resins are commonly used in subterranean consolidation operations, and some suitable resins include two-component epoxy-based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, polyester resins and hybrids and copolymers thereof, polyurethane resins and hybrids and copolymers thereof, acrylate resins, and mixtures thereof. Some suitable resins, such as epoxy resins, may be cured with an internal catalyst or activator so that when pumped downhole, they may be cured using only time and temperature. Other suitable resins, such as furan resins generally require a time-delayed catalyst or an external catalyst to help activate the polymerization of the resins if the cure temperature is low (i.e., less than 250° F.), but will cure under the effect of time and temperature if the formation temperature is above about 250° F., preferably above about 300° F. It is within the ability of one skilled in the art, with the benefit of this disclosure, to select a suitable resin for use in embodiments of the present invention and to determine whether a catalyst is required to trigger curing.

Selection of a suitable resin may be affected by the temperature of the subterranean formation to which the fluid will be introduced. By way of example, for subterranean formations having a bottom hole static temperature ("BHST") ranging from about 60° F. to about 250° F., two-component epoxy-based resins comprising a hardenable resin component and a hardening agent component containing specific hardening agents may be preferred. For subterranean formations having a BHST ranging from about 300°

F. to about 600° F., a furan-based resin may be preferred. For subterranean formations having a BHST ranging from about 200° F. to about 400° F., either a phenolic-based resin or a one-component HT epoxy-based resin may be suitable. For subterranean formations having a BHST of at least about 175° F., a phenol/phenol formaldehyde/furfuryl alcohol resin may also be suitable.

Any solvent that is compatible with the resin and achieves the desired viscosity effect is suitable for use in the present invention. It is within the ability of one skilled in the art, with the benefit of this disclosure, to determine whether and how much solvent is needed to achieve a suitable viscosity in a particular application.

One resin-type coating material suitable for use in the methods of the present invention is a two-component epoxy-based resin comprising a hardenable resin component and a hardening agent component. The first component is a hardenable resin component comprising a hardenable resin and an optional solvent. The solvent may be added to the resin to reduce its viscosity for ease of handling, mixing, and transferring. It is within the ability of one skilled in the art with the benefit of this disclosure to determine if and how much solvent may be needed to achieve a viscosity suitable to the subterranean conditions. Factors that may affect this decision include geographic location of the well and the surrounding weather conditions. An alternate way to reduce the viscosity of the liquid hardenable resin is to heat it. This method avoids the use of a solvent altogether, which may be desirable in certain circumstances. The second component is the liquid hardening agent component, which is comprised of a hardening agent, a silane coupling agent, a surfactant, an optional hydrolyzable ester for, inter alia, breaking gelled fracturing fluid films on the particulate material, and an optional liquid carrier fluid for, inter alia, reducing the viscosity of the liquid hardening agent component. It is within the ability of one skilled in the art with the benefit of this disclosure to determine if and how much liquid carrier fluid is needed to achieve a viscosity suitable to the subterranean conditions.

Examples of hardenable resins that can be used in the hardenable resin component include, but are not limited to, organic resins such as bisphenol A diglycidyl ether resin, butoxymethyl butyl glycidyl ether resin, bisphenol A-epichlorohydrin resin, polyepoxide resin, novolak resin, polyester resin, phenol-aldehyde resin, urea-aldehyde resin, furan resin, urethane resin, a glycidyl ether, and combinations thereof. The hardenable resin used is included in the hardenable resin component in an amount in the range of from about 60% to about 100% by weight of the hardenable resin component.

Any solvent that is compatible with the hardenable resin and achieves the desired viscosity effect is suitable for use in the hardenable resin component of the integrated consolidation fluids of the present invention. Some preferred solvents are those having high flash points (e.g., about 125° F.) because of, inter alia, environmental factors; such solvents include butyl lactate, butylglycidyl ether, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene, fatty acid methyl esters, and combinations thereof. Other preferred solvents include aqueous dissolvable solvents such as, methanol, isopropanol, butanol, glycol ether solvents, and combinations thereof. Suitable glycol ether solvents include, but are not limited to, diethylene glycol methyl ether, dipropylene glycol methyl ether, 2-butoxy ethanol, ethers of a C2 to C6 dihydric alkanol containing at least one C1 to C6 alkyl group, mono ethers of dihydric alkanols, methoxypropanol, butoxyethanol, hexoxyethanol, and isomers thereof.

As described above, use of a solvent in the hardenable resin component is optional but may be desirable to reduce the viscosity of the hardenable resin component for ease of handling, mixing, and transferring. The amount of the solvent used in the hardenable resin component is in the range of from about 0.1% to about 30% by weight of the hardenable resin component.

Examples of the hardening agents that can be used in the liquid hardening agent component of the two-component consolidation fluids of the present invention include, but are not limited to, piperazine, derivatives of piperazine (e.g., aminoethylpiperazine), 2H-pyrrole, pyrrole, imidazole, pyrazole, pyridine, pyrazine, pyrimidine, pyridazine, indolizine, isoindole, 3H-indole, indole, 1H-indazole, purine, 4H-quinolizine, quinoline, isoquinoline, phthalazine, naphthyridine, quinoxaline, quinazoline, 4H-carbazole, carbazole, β-carboline, phenanthridine, acridine, phenathroline, phenazine, imidazolidine, phenoxazine, cinnoline, pyrrolidine, pyrroline, imidazoline, piperidine, indoline, isoindoline, quinuclindine, morpholine, azocine, azepine, 2H-azepine, 1,3,5-triazine, thiazole, pteridine, dihydroquinoline, hexa methylene imine, indazole, amines, aromatic amines, polyamines, aliphatic amines, cyclo-aliphatic amines, amides, polyamides, 2-ethyl-4-methyl imidazole, 1,1,3-trichlorotrifluoroacetone, and combinations thereof. The chosen hardening agent often effects the range of temperatures over which a hardenable resin is able to cure. By way of example and not of limitation, in subterranean formations having a temperature from about 60° F. to about 250° F., amines and cyclo-aliphatic amines such as piperidine, triethylamine, N,N-dimethylaminopyridine, benzyldimethylamine, tris(dimethylaminomethyl)phenol, and 2-($N_2$N-dimethylaminomethyl)phenol are preferred with N,N-dimethylaminopyridine most preferred. In subterranean formations having higher temperatures, 4,4'-diaminodiphenyl sulfone may be a suitable hardening agent. Hardening agents that comprise piperazine or a derivative of piperazine have been shown capable of curing various hardenable resins from temperatures as low as about 70° F. to as high as about 350° F. The hardening agent used is included in the liquid hardening agent component in an amount sufficient to consolidate the coated particulates. In certain embodiments of the present invention, the hardening agent used is included in the liquid hardenable resin component in the range of from about 40% to about 60% by weight of the liquid hardening agent component.

The silane coupling agent may be used, inter alia, to act as a mediator to help bond the resin to formation particulates and/or gravel particulates. Examples of suitable silane coupling agents include, but are not limited to, N-β-(aminoethyl)-γ-aminopropyl trimethoxysilane, N-2-(aminoethyl)-3-aminopropyltrimethoxysilane, 3-glycidoxypropyltrimethoxysilane, and combinations thereof. The silane coupling agent used is included in the liquid hardening agent component in an amount capable of sufficiently bonding the resin to the particulate. In some embodiments of the present invention, the silane coupling agent used is included in the liquid hardenable resin component in the range of from about 0.1% to about 3% by weight of the liquid hardening agent component.

Any surfactant compatible with the hardening agent and capable of facilitating the coating of the resin onto particles in the subterranean formation may be used in the hardening agent component of the integrated consolidation fluids of the present invention. Such surfactants include, but are not limited to, an alkyl phosphonate surfactant (e.g., a C12-C22 alkyl phosphonate surfactant), an ethoxylated nonyl phenol phosphate ester, one or more cationic surfactants, and one or more nonionic surfactants. Mixtures of one or more cationic and nonionic surfactants also may be suitable. Examples of such surfactant mixtures are described in U.S. Pat. No. 6,311,773, the relevant disclosure of which is incorporated herein by reference. The surfactant or surfactants used are included in the liquid hardening agent component in an amount in the range of from about 1% to about 10% by weight of the liquid hardening agent component.

While not required, examples of hydrolyzable esters that can be used in the hardening agent component of the integrated consolidation fluids of the present invention include, but are not limited to, a mixture of dimethylglutarate, dimethyladipate, and dimethylsuccinate; sorbitol; catechol; dimethylthiolate; methyl salicylate; dimethyl salicylate; dimethylsuccinate; ter-butylhydroperoxide; and combinations thereof. When used, a hydrolyzable ester is included in the hardening agent component in an amount in the range of from about 0.1% to about 3% by weight of the hardening agent component.

Use of a diluent or liquid carrier fluid in the hardenable resin composition is optional and may be used to reduce the viscosity of the hardenable resin component for ease of handling, mixing, and transferring. Any suitable carrier fluid that is compatible with the hardenable resin and achieves the desired viscosity effects is suitable for use in the present invention. Some preferred liquid carrier fluids are those having high flash points (e.g., above about 125° F.) because of, inter alia, environmental factors; such solvents include those solvents previously described for use with the hardenable resin component.

Tackifiers Suitable for Use in the Present Invention

In certain embodiments, the particulates of the gravel matrix composition may be coated with tackifiers. The coating process may occur downhole, on the surface, or in both locations. Tackifiers can, among other benefits, reduce the migration or production of formation fines. Additionally, tackifiers may provide some limited resistance to compaction by coating the particulates with a film that may help to prevent slippage of the particles past one another.

Tackifiers suitable for use in the present invention include non-aqueous tackifying agents, aqueous tackifying agents, silyl-modified polyamides, and curable resin compositions that are capable of curing to form hardened substances. In addition to encouraging the particulates to form aggregates, the use of tackifiers may reduce fines migration or undesirable production of fines. Tackifiers may be applied on-the-fly, applying the substance to the particulates at the well site, directly prior to pumping the fluid-gravel mixture into the well bore.

Tackifying agents suitable for use in the consolidation fluids of the present invention comprise any compound that, when in liquid form or in a solvent solution, will form a non-hardening coating upon a particulate. A particularly preferred group of tackifying agents comprise polyamides that are liquids or in solution at the temperature of the subterranean formation such that they are, by themselves, non-hardening when introduced into the subterranean formation. A particularly preferred product is a condensation reaction product comprised of commercially available polyacids and a polyamine. Such commercial products include compounds such as mixtures of C36 dibasic acids containing some trimer and higher oligomers and also small amounts of monomer acids that are reacted with polyamines. Other polyacids include trimer acids, synthetic acids produced from fatty acids, maleic anhydride, acrylic acid, and the like. Such acid compounds are commercially available from companies such as Witco Corporation, Union Camp, Chemtall, and Emery Industries. The reaction products are available from, for example, Champion Technologies, Inc. and Witco Corporation. Additional compounds which may be used as tackifying compounds include liquids and solutions of, for example, polyesters, polycarbonates and polycarbamates, natural resins such as shellac and the like. Other suitable tackifying agents are described in U.S. Pat. Nos. 5,853,048 and 5,833,000, the relevant disclosures of which are herein incorporated by reference.

Tackifying agents suitable for use in the present invention may be either used such that they form non-hardening coating or they may be combined with a multifunctional material capable of reacting with the tackifying compound to form a hardened coating. A "hardened coating," as used herein, means that the reaction of the tackifying compound with the multifunctional material will result in a substantially non-flowable reaction product that exhibits a higher compressive strength in a consolidated agglomerate than the tackifying compound alone with the particulates. In this instance, the tackifying agent may function similarly to a hardenable resin. Multifunctional materials suitable for use in the present invention include, but are not limited to, aldehydes such as formaldehyde, dialdehydes such as glutaraldehyde, hemiacetals or aldehyde releasing compounds, diacid halides, dihalides such as dichlorides and dibromides, polyacid anhydrides such as citric acid, epoxides, furfiraldehyde, glutaraldehyde or aldehyde condensates and the like, and combinations thereof. In some embodiments of the present invention, the multifunctional material may be mixed with the tackifying compound in an amount of from about 0.01 to about 50 percent by weight of the tackifying compound to effect formation of the reaction product. In some preferable embodiments, the compound is present in an amount of from about 0.5 to about 1 percent by weight of the tackifying compound. Suitable multifunctional materials are described in U.S. Pat. No. 5,839,510, the relevant disclosure of which is herein incorporated by reference. Other suitable tackifying agents are described in U.S. Pat. No. 5,853,048.

Solvents suitable for use with the tackifying agents of the present invention include any solvent that is compatible with the tackifying agent and achieves the desired viscosity effect. The solvents that can be used in the present invention preferably include those having high flash points (most preferably above about 125° F.). Examples of solvents suitable for use in the present invention include, but are not limited to, butylglycidyl ether, dipropylene glycol methyl ether, butyl bottom alcohol, dipropylene glycol dimethyl ether, diethyleneglycol methyl ether, ethyleneglycol butyl ether, methanol, butyl alcohol, isopropyl alcohol, diethyleneglycol butyl ether, propylene carbonate, d'limonene, 2-butoxy ethanol, butyl acetate, furfuryl acetate, butyl lactate, dimethyl sulfoxide, dimethyl formamide, fatty acid methyl esters, and combinations thereof.

Degradable Materials Suitable for Use in the Present Invention

In certain embodiments, a degradable material may optionally be incorporated into the gravel matrix composition, in part, to improve the permeability of the gravel matrix composition after degradation. The degradable material is incorporated in the gravel matrix composition, preferably uniformly. After the requisite time period dictated by the characteristics of the particular degradable material used, the degradable material undergoes an irreversible degradation. This degradation, in effect, causes the degradable material to substantially be removed from the gravel matrix composition. As a result, interstices and voids may be created in the gravel matrix composition. These interstices and voids may enhance the permeability and porosity of the gravel matrix composition, which may result in, inter alia, enhanced conductivity through the deviated well bore. In certain preferred embodiments, these voids are channel-like and interconnected so that the permeability of the gravel matrix composition is further enhanced.

In certain embodiments, the gravel matrix composition may be both treated with a curable resin and have a degradable material incorporated therein. The curable resin may, among other benefits, harden the quantity of particulates in place to reduce further adjustment or movement of the particulates, particularly after degradation of the degradable material.

A variety of degradable materials may optionally be used with the present invention. Examples of degradable materials that may optionally be used with the present invention include, but are not limited to, degradable polymers, dehydrated compounds, salts, or mixtures thereof. The differing molecular structures of the degradable materials that are suitable for the present invention give a wide range of physical properties as well as the possibility of regulating the degradation rate.

As for degradable polymers, a polymer is considered to be "degradable" herein if the degradation is due to, inter alia, chemical and/or radical process such as hydrolysis, oxidation, enzymatic degradation, or UV radiation. The degradability of a polymer depends at least in part on its backbone structure. For instance, the presence of hydrolyzable and/or oxidizable linkages in the backbone often yields a material that will degrade as described herein. The rates at which such polymers degrade are dependent on the type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how it degrades, e.g., temperature, presence of moisture, oxygen, microorganisms, enzymes, pH, and other factors.

Suitable examples of degradable polymers that may be used in accordance with the present invention include, but are not limited to, those described in the publication of Advances in Polymer Science, Vol. 157, entitled "Degradable Aliphatic Polyesters" edited by A. C. Albertsson, pp. 1-138. Specific examples include homopolymers, random, block, graft, and star- and hyper-branched aliphatic polyesters. Such suitable polymers may be prepared by polycondensation reactions, ring-opening polymerizations, free radical polymerizations, anionic polymerizations, carbocationic polymerizations, and coordinative ring-opening polymerization, e.g., lactones, and any other suitable process. Specific examples of suitable polymers include polysaccharides such as dextran or cellulose; chitin; chitosan; proteins; aliphatic polyesters; poly(lactide); poly(glycolide); poly(ε-caprolactone); poly(hydroxybutyrate); poly(anhydrides); aliphatic polycarbonates; poly(orthoesters); poly(amino acids); poly(ethylene oxide); and polyphosphazenes. Of these suitable polymers, aliphatic polyesters and polyanhydrides are preferred.

Aliphatic polyesters degrade chemically, inter alia, by hydrolytic cleavage. Hydrolysis can be catalyzed by either acids or bases. Generally, during the hydrolysis, carboxylic end groups are formed during chain scission, and these groups may enhance the rate of further hydrolysis. This mechanism is known in the art as "autocatalysis," and is thought to make polyester matrices more bulk eroding.

Suitable aliphatic polyesters have the general formula of repeating units shown below:

Formula I where n is an integer between 75 and 10,000 and R is selected from the group consisting of hydrogen, alkyl, aryl, alkylaryl, acetyl, heteroatoms, and mixtures thereof. Of the suitable aliphatic polyesters, poly(lactide) is preferred. Poly(lactide) is synthesized either from lactic acid by a condensation reaction or more commonly by ring-opening polymerization of cyclic lactide monomer. Since both lactic acid and lactide can achieve the same repeating unit, the general term poly(lactic acid), as used herein, refers to writ of Formula I without any limitation as to how the polymer was made such as from lactides, lactic acid, or oligomers, and without reference to the degree of polymerization or level of plasticization.

The lactide monomer exists generally in three different forms: two stereoisomers L- and D-lactide and racemic D,L-lactide (meso-lactide). The oligomers of lactic acid, and oligomers of lactide are defined by the formula:

Formula II where m is an integer: $2 \leq m \leq 75$. Preferably, m is an integer: $2 \leq m \leq 10$. These limits correspond to number average molecular weights below about 5,400 and below about 720, respectively. The chirality of the lactide units provides a means to adjust, inter alia, degradation rates, as well as physical and mechanical properties. Poly(L-lactide), for instance, is a semi-crystalline polymer with a relatively slow hydrolysis rate. This slow hydrolysis rate could be desirable in applications of the present invention where a slower degradation of the degradable material is desired. Poly(D,L-lactide) may be a more amorphous polymer with a resultant faster hydrolysis rate. This faster rate may be suitable for other applications where a more rapid degradation may be appropriate. The stereoisomers of lactic acid may be used individually or combined in accordance with the present invention. Additionally, they may be copolymerized with, for example, glycolide or other monomers like ε-caprolactone, 1,5-dioxepan-2-one, trimethylene carbonate, or other suitable monomers to obtain polymers with different properties or degradation times. Additionally, the lactic acid stereoisomers can be modified by blending high and low molecular weight polylactide or by blending polylactide with other polyesters.

Aliphatic polyesters useful in the present invention may be prepared by substantially any of the conventionally known manufacturing methods such as those described in U.S. Pat. Nos. 6,323,307; 5,216,050; 4,387,769; 3,912,692; and 2,703,316, the relevant disclosure of which are incorporated herein by reference. In addition to the other qualities above, the plasticizers may enhance the degradation rate of the degradable polymeric materials.

Polyanhydrides are another type of particularly suitable degradable polymer useful in the present invention. Polyanhydride hydrolysis proceeds, inter alia, via free carboxylic acid chain-ends to yield carboxylic acids as final degradation products. The erosion time can be varied over a broad range of changes in the polymer backbone. Examples of suitable polyanhydrides include poly(adipic anhydride), poly(suberic anhydride), poly(sebacic anhydride), and poly(dodecanedioic anhydride). Other suitable examples include, but are not limited to, poly(maleic anhydride) and poly(benzoic anhydride).

The physical properties of degradable polymers depend on several factors such as the composition of the repeat units, flexibility of the chain, presence of polar groups, molecular mass, degree of branching, crystallinity, orientation, etc. For example, short chain branches reduce the degree of crystallinity of polymers while long chain branches lower the melt viscosity and impart, inter alia, elongational viscosity with tension-stiffening behavior. The properties of the material used can be further tailored by blending, and copolymerizing it with another polymer, or by a change in the macromolecular architecture (e.g., hyperbranched polymers, star-shaped, or dendrimers). The properties of any such suitable degradable polymers (e.g., hydrophobicity, hydrophilicity, rate of degradation) can be tailored by introducing select functional groups along the polymer chains. For example, poly(phenyllactide) will degrade at about ⅕th of the rate of racemic poly(lactide) at a pH of 7.4 at 55° C. One of ordinary skill in the art with the benefit of this disclosure will be able to determine the appropriate functional groups to introduce to the polymer chains to achieve the desired physical properties of the degradable polymers.

Dehydrated compounds may be used in accordance with the present invention as a degradable material. A dehydrated compound is suitable for use in the present invention if it will degrade over time as it is rehydrated. For example, a particulate solid anhydrous borate material that degrades over time may be suitable. Specific examples of particulate solid anhydrous borate materials that may be used include, but are not limited to, anhydrous sodium tetraborate (also known as anhydrous borax) and anhydrous boric acid. These anhydrous borate materials are only slightly soluble in water. However, with time and heat in a subterranean environment, the anhydrous borate materials react with the surrounding aqueous fluid and are hydrated. The resulting hydrated borate materials are substantially soluble in water as compared to anhydrous borate materials and as a result, degrade in the aqueous fluid. In some instances, the total time required for the anhydrous borate materials to degrade in an aqueous fluid is in the range of from about 8 hours to about 72 hours depending upon the temperature of the subterranean zone in which they are placed.

Salts may be used in accordance with the present invention as a degradable material. A salt is suitable for use in the present invention if it will degrade over time as it is solubilizes. For example, a rock salt that solubilizes or dissolves in an aqueous solution may be suitable. Specific examples of salts that may be used include, but are not limited to, rock salt, fine salt, sodium chloride, calcium chloride, potassium chloride, and other salts known in the art.

Blends of certain degradable materials and other compounds may also be suitable. One example of a suitable blend of materials is a mixture of poly(lactic acid) and sodium borate where the mixing of an acid and base could result in a neutral solution where this is desirable. Another example would include a blend of poly(lactic acid) and boric oxide. Other materials that undergo an irreversible degradation may also be suitable, if the products of the degradation do not undesirably interfere with either the conductivity of the particulate matrix or with the production of any of the fluids from the subterranean formation.

In choosing the appropriate degradable material, one should consider the degradation products that will result. Also, these degradation products should not adversely affect other operations or components. The choice of degradable material also can depend, at least in part, on the conditions of the well, e.g., well bore temperature. For instance, lactides have been found to be suitable for lower temperature wells, including those within the range of 60° F. to 150° F., and polylactides have been found to be suitable for well bore temperatures above this range. Also, poly(lactic acid) may be suitable for higher temperature wells. Dehydrated salts may also be suitable for higher temperature wells. Also, in some embodiments, a preferable result is achieved if the degradable material degrades slowly over time as opposed to instantaneously. In some embodiments, it may be desirable when the degradable material does not substantially degrade until after the degradable material has been substantially placed in a desired location within a subterranean formation.

If the application in which the degradable material will be used does not contain a component that will enable the degradable material to degrade, e.g., in a dry gas hole, then in alternative embodiments of the present invention, the degradable material can be mixed with inorganic or organic compounds to form what is referred to herein as a composite. In preferred alternative embodiments, the inorganic or organic compound in the composite is hydrated. Examples of the hydrated organic or inorganic solid compounds that can be used in the self-degradable diverting material include, but are not limited to, hydrates of organic acids or their salts such as sodium acetate trihydrate, L-tartaric acid disodium salt dihydrate, sodium citrate dihydrate, hydrates of inorganic acids or their salts such as sodium tetraborate decahydrate, sodium hydrogen phosphate heptahydrate, sodium phosphate dodecahydrate, amylose, starch-based hydrophilic polymers, and cellulose-based hydrophilic polymers. Of these, sodium acetate trihydrate is preferred. The lactide units of the aliphatic polyester and the releasable water of the organic or inorganic solid compound used are preferably present in the mixture in equal molar amounts. The degradable material is then, in a sense, self-degradable, in that the degradable material should at least partially degrade in the releasable water provided by the hydrated organic or inorganic compound which dehydrates over time when heated in the subterranean zone.

The specific features of the degradable material may be chosen or modified to provide the gravel matrix composition with optimum conductivity while enhancing, at least to some degree, the structural support to a chosen longitudinal portion of a deviated well bore. Preferably, the degradable material is selected to have a size and shape similar to the size and shape of the curable particulates to help maintain substantial uniformity within the mixture. It is preferable that the particulates and the degradable material do not segregate within the gravel matrix composition. Whichever degradable material is used, the degradable materials may have any shape, depending on the desired characteristics of the resultant voids in the gravel matrix including, but not limited to, particles having the physical shape of platelets, shavings, flakes, ribbons, rods, strips, spheroids, toroids, pellets, tablets, or any other physical shape. The physical shape of the degradable material should be chosen so as to enhance the desired shape and relative composition of the resultant voids within the gravel matrix. For example, a rod-like particle shape may be suitable in applications wherein channel-like voids in the gravel matrix composition are desired. One of ordinary skill in the art with the benefit of this disclosure will recognize the specific degradable material and the preferred size and shape for a given application.

While resins, degradable materials, and tackifiers may optionally be used in the present invention, separately or in combination, the use of these components are not a necessary part of the present invention in certain embodiments.

In certain embodiments, a method of enhancing at least partially the structural integrity of a longitudinal portion of a deviated well bore comprises providing a gravel matrix composition that comprises particulates having an average particle size of about 20 mesh or larger; providing a longitudinal portion of a deviated well bore; and placing a sufficient amount of the gravel matrix composition in a chosen longitudinal portion of the deviated well bore to enhance the structural support of the longitudinal portion of the deviated well bore.

In certain embodiments, a method of enhancing at least partially the structural integrity of a longitudinal portion of a deviated well bore comprises providing a gravel matrix composition that comprises particulates and a curable resin; providing a longitudinal portion of a deviated well bore; placing a sufficient amount of the gravel matrix composition in a chosen longitudinal portion of the deviated well bore to enhance the structural support of the longitudinal portion of the deviated well bore; allowing the curable resin to cure; allowing the gravel matrix composition to form; and producing fluids through the gravel matrix composition.

In certain embodiments, a method of enhancing at least partially the structural integrity of a longitudinal portion of a deviated well bore comprises providing a gravel matrix composition that comprises particulates and a tackifier; providing a longitudinal portion of a deviated well bore; placing a sufficient amount of the gravel matrix composition in a chosen longitudinal portion of the deviated well bore to enhance the structural support of the longitudinal portion of the deviated well bore; allowing the gravel matrix composition to form; and producing fluids through the gravel matrix composition.

Placement of Gravel Matrix Compositions in Well Bores Suitable for Use in the Present Invention The gravel matrix composition may be placed in a chosen longitudinal portion of a deviated well bore by a variety of methods recognizable by one of ordinary skill in the art with the benefit of this disclosure. In certain embodiments, the methods of the present invention may use coiled tubing to place the gravel matrix composition in a chosen longitudinal portion of a deviated well bore.

In certain embodiments, the gravel matrix composition can be pumped to its final destination via a carrier fluid. In still further embodiments, the gravel matrix composition may be delivered via a treatment fluid or fracturing fluid such as a pad fluid. In some instances, the carrier fluid may be a viscosified carrier fluid.

In certain embodiments, the coiled tubing may be removed simultaneously as the gravel matrix composition leaves the coiled tubing. In this way, the coiled tubing may deposit the gravel matrix composition throughout a chosen longitudinal portion of the deviated well bore. If desired, additional pressure can be applied with a displacement or other fluid to pack or further consolidate the gravel matrix composition in place.

The step of placing the gravel matrix composition in a longitudinal portion of a deviated well bore may occur before or after a fracturing operation. In some cases, the step of placing a gravel matrix composition in a longitudinal portion of a deviated well bore may occur concurrently with a portion of a fracturing or stimulation operation. In still further embodiments, the step of placing a gravel matrix composition in a longitudinal portion of a deviated well bore may occur before any flow back of fluid from a fracturing operation.

In certain embodiments, a method of placing a gravel matrix composition in a longitudinal portion of a deviated well bore comprises the steps of inserting a coiled tubing into the longitudinal portion of the deviated well bore; placing a sufficient amount of the gravel matrix composition in a chosen longitudinal portion of the deviated well bore to enhance the structural support of the longitudinal portion of the deviated well bore; placing the gravel matrix composition into the coiled tubing; flowing a fluid through the coiled tubing; and depositing the gravel matrix composition in a chosen longitudinal portion of the deviated well bore.

In other embodiments, the method of placing the gravel matrix composition in the longitudinal portion of the deviated well bore may further comprise the steps of applying pressure to the gravel matrix composition using a downhole fluid of sufficient pressure to consolidate the gravel matrix composition in place; and removing the coiled tubing from the longitudinal portion of the deviated well bore.

To facilitate a better understanding of the present invention, the following examples of certain embodiments are given. In no way should the following examples be read to limit, or define, the scope of the invention.

EXAMPLES

Example 1

Sand particulates were treated with a two-component epoxy-based resin, capable of forming a hardened, consolidated mass. The sand particulates were of an average particle size of 20/40 mesh. In this case, approximately 250 grams of treated sand particulates were mixed with approximately 300 ml of a gelled carrier fluid to form approximately a 7 lbs/gal slurry. The slurry was then packed into a brass chamber under vacuum. The chamber was then placed in an oven, and the treated particulates were allowed to cure at the various temperatures listed in Table 1. After allowing the treated particulates to cure for 40 hours, the consolidated resin-treated sand particulates was extruded from the brass chamber to obtain a core sample, which was then subjected to unconfined compressive strength (UCS) measurements.

Table 1 shows the results of these tests performed on each of the samples, cured at various temperatures at different resin concentrations.

TABLE 1

CONSOLIDATION STRENGTH OF COATED PARTICLES

| Resin Concentration | Unconfined Compressive Strength (psi) Temperature for 40 Hour Cure | | |
|---|---|---|---|
| | 125° F. | 175° F. | 225° F. |
| 1% | 134 | 134 | 291 |
| 2% | 878 | 1073 | 910 |
| 3% | 1483 | 1943 | 2050 |

Example 2

Bauxite particulates of an average particle size of 20/40 mesh were treated with a furan-based resin, capable of forming a hardened, consolidated mass. As in Example 1, the resulting slurry was placed in a brass chamber under vacuum to cure at various temperatures and resin concentrations. After a cure time of 20 hours in an oven, core samples were extruded from the brass chamber. Finally, the core samples were subjected to unconfined compressive strength measurements. Table 2 shows the unconfined compressive strength measured for each of the samples that were cured at various resin cure temperatures at different resin concentrations.

TABLE 2

CONSOLIDATION STRENGTH OF COATED PARTICLES

| Resin Concentration | Unconfined Compressive Strength (psi) Temperature for 20 Hour Cure | | |
|---|---|---|---|
| | 325° F. | 375° F. | 425° F. |
| 1% | 33 | 108 | 79 |
| 2% | 141 | 450 | 222 |
| 3% | 473 | 1061 | 755 |

Thus, the present invention is well adapted to carry out the objects and attain the ends and advantages mentioned as well as those which are inherent therein. While numerous changes may be made by those skilled in the art, such changes are encompassed within the spirit and scope of this invention as defined by the appended claims.

What is claimed is:

1. A method of enhancing at least partially the structural integrity of a longitudinal portion of a deviated well bore comprising:
providing a gravel matrix composition that comprises particulates having an average particle size of about 20 mesh or larger;
inserting a coiled tubing into the longitudinal portion of the deviated well bore; and
removing the coiled tubing while placing a sufficient amount of the gravel matrix composition in the longitudinal portion to enhance the structural support of the longitudinal portion.

2. The method of claim 1 wherein the gravel matrix composition comprises particulates having an average particle size of about 12 mesh or larger.

3. The method of claim 1 wherein the gravel matrix composition comprises particulates having an average particle size of about 10 mesh or larger.

4. The method of claim 1 wherein the particulates comprise composite particulates wherein the composite particulates comprise a binder and a filler material wherein the filler material comprises at least one filler material selected from the group consisting of: silica, alumina, a fumed carbon, carbon black, graphite, mica, titanium dioxide, meta-silicate, calcium silicate, kaolin, talc, zirconia, boron, fly ash, a hollow glass microsphere, solid glass, and any combination thereof.

5. The method of claim 1 wherein the particulates comprise at least one particulate selected from the group consisting of: sand, bauxite, a ceramic material, a glass material, a polymer material, a polytetrafluoroethylene material, a nut shell piece, a seed shell piece, a fruit pit piece, wood, a composite particulate, a proppant particulate, and any combination thereof.

6. The method of claim 1 wherein at least a portion of the particulates have a physical shape selected from the group consisting of: a platelet, a shaving, a flake, a ribbon, a rod, a strip, a spheroid, an ellipsoid, a toroid, a pellet, a tablet, and any combination thereof.

7. A method comprising:
providing a gravel matrix composition that comprises particulates having an average particle size of about 20 mesh or larger;
providing a longitudinal portion of a deviated well bore;
inserting a coiled tubing into the longitudinal portion of the deviated well bore; and
removing the coiled tubing while placing a sufficient amount of the gravel matrix composition in the longitudinal portion to enhance the structural support of the longitudinal portion.

8. The method of claim 7 wherein the gravel matrix composition comprises particulates having an average particle size of about 12 mesh or larger.

9. The method of claim 7 wherein the gravel matrix composition comprises particulates having an average particle size of about 10 mesh or larger.

10. The method of claim 7 wherein the particulates comprise composite particulates wherein the composite particulates comprise a binder and a filler material wherein the filler material comprises at least one filler material selected from the group consisting of: silica, alumina, a fumed carbon, carbon black, graphite, mica, titanium dioxide, meta-silicate, calcium silicate, kaolin, talc, zirconia, boron, fly ash, a hollow glass microsphere, solid glass, and any combination thereof.

11. The method of claim 7 wherein at least a portion of the particulates have a physical shape selected from the group consisting of: a platelet, a shaving, a flake, a ribbon, a rod, a strip, a spheroid, an ellipsoid, a toroid, a pellet, a tablet, and any combination thereof.

12. The method of claim 7 wherein the particulates comprise at least one particulate selected from the group consisting of: sand, bauxite, a ceramic material, a glass material, a polymer material, a polytetrafluoroethylene material, a nut shell piece, a seed shell piece, a fruit pit piece, wood, a composite particulate, a proppant particulate, and any combination thereof.

13. A method of enhancing at least partially the structural integrity of a longitudinal portion of a deviated well bore comprising:

providing a gravel matrix composition that comprises particulates having an average particle size of about 20 mesh or larger;

inserting a coiled tubing into the longitudinal portion of a deviated well bore; and placing a sufficient amount of the gravel matrix composition in the longitudinal portion to enhance the structural support of the longitudinal portion while simultaneously removing the coiled tubing.

14. The method of claim 13 wherein the gravel matrix composition comprises particulates having an average particle size of about 12 mesh or larger.

15. The method of claim 13 wherein the gravel matrix composition comprises particulates having an average particle size of about 10 mesh or larger.

16. The method of claim 13 wherein the particulates comprise composite particulates wherein the composite particulates comprise a binder and a filler material wherein the filler material comprises at least one filler material selected from the group consisting of: silica, alumina, a fumed carbon, carbon black, graphite, mica, titanium dioxide, meta-silicate, calcium silicate, kaolin, talc, zirconia, boron, fly ash, a hollow glass microsphere, solid glass, and any combination thereof.

17. The method of claim 13 wherein at least a portion of the particulates have a physical shape selected from the group consisting of: a platelet, a shaving, a flake, a ribbon, a rod, a strip, a spheroid, an ellipsoid, a toroid, a pellet, a tablet, and any combination thereof.

18. The method of claim 13 wherein the particulates comprise at least one particulate selected from the group consisting of: sand, bauxite, a ceramic material, a glass material, a polymer material, a polytetrafluoroethylene material, a nut shell piece, a seed shell piece, a fruit pit piece, wood, a composite particulate, a proppant particulate, and any combination thereof.

* * * * *